United States Patent
Weiss

(10) Patent No.: US 10,440,509 B1
(45) Date of Patent: Oct. 8, 2019

(54) TECHNOLOGY FOR MANAGING LOCATION-BASED FUNCTIONALITIES FOR ELECTRONIC DEVICES

(71) Applicant: WALGREEN CO., Deerfield, IL (US)

(72) Inventor: Benjamin Weiss, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 15/954,264

(22) Filed: Apr. 16, 2018

(51) Int. Cl.
  *H04W 24/00* (2009.01)
  *H04W 4/021* (2018.01)
  *G06Q 30/06* (2012.01)
  *H04W 4/23* (2018.01)

(52) U.S. Cl.
  CPC ........ *H04W 4/022* (2013.01); *G06Q 30/0601* (2013.01); *H04W 4/23* (2018.02)

(58) Field of Classification Search
  CPC .... H04W 4/02; H04W 64/00; H04L 29/08657
  USPC ..... 455/414.3, 421, 412.2, 456.1–456.3, 457
  See application file for complete search history.

(56) References Cited

U.S. PATENT DOCUMENTS

| | | | | |
|---|---|---|---|---|
| 8,682,300 | B2 * | 3/2014 | Stopel | H04W 4/029 455/414.1 |
| 2012/0310527 | A1 * | 12/2012 | Yariv | G01C 21/3679 701/426 |
| 2013/0072226 | A1 * | 3/2013 | Thramann | H04W 4/028 455/456.1 |
| 2014/0292511 | A1 | 10/2014 | Sheha et al. | |
| 2015/0120455 | A1 | 4/2015 | McDevitt et al. | |
| 2015/0163631 | A1 * | 6/2015 | Quam | G05B 15/02 455/456.1 |
| 2015/0289095 | A1 * | 10/2015 | Sabatelli | H04W 4/80 455/414.2 |
| 2015/0294362 | A1 * | 10/2015 | Royyuru | G06Q 30/0261 705/14.58 |
| 2015/0346968 | A1 * | 12/2015 | Johnson | G01C 21/00 715/771 |

(Continued)

FOREIGN PATENT DOCUMENTS

EP 2744234 A1 6/2014

OTHER PUBLICATIONS econsultancy.com, "How retailers are using geofencing to improve in-store CX," Jan. 17, 2018. Retrieved from the Internet on Jul. 25, 2018: https://www.econsultancy.com/blog/69727-how-retailers-are-using-geofencing-to-improve-in-store-cx.

(Continued)

*Primary Examiner* — Dai Phuong
(74) *Attorney, Agent, or Firm* — Marshall, Gerstein & Borun LLP; Randall G. Rueth

(57) ABSTRACT

Systems and methods for managing and facilitating geofencing features associated with electronic devices are disclosed. According to certain aspects, an entity may own or manage a set of retail stores. A server associated with the entity may receive an estimated location of an electronic device, and may determine that the estimated location is in proximity to one of the set of retail stores. The server may further calculate a geofencing boundary for the retail store based on certain location-based data, and may determine whether the estimated location of the electronic device is within the geofencing boundary. The server may additionally facilitate certain geofencing features based on the determination.

17 Claims, 5 Drawing Sheets

(56) References Cited

U.S. PATENT DOCUMENTS

| | | | |
|---|---|---|---|
| 2016/0119748 A1* | 4/2016 | Li | H04W 4/021 455/456.3 |
| 2016/0157273 A1* | 6/2016 | Ljung | H04W 76/10 455/435.1 |
| 2016/0171545 A1* | 6/2016 | Cheung | G06Q 30/0261 705/14.58 |
| 2016/0198295 A1* | 7/2016 | Jeon | H04W 4/001 455/456.3 |
| 2017/0055122 A1* | 2/2017 | Barron | H04W 4/021 |
| 2017/0180932 A1* | 6/2017 | Zises | H04W 4/021 |
| 2018/0145976 A1* | 5/2018 | Barillaud | H04L 63/0861 |
| 2018/0165893 A1* | 6/2018 | Palmer | G07C 5/008 |
| 2018/0234794 A1* | 8/2018 | Cheung | H04W 4/021 |

OTHER PUBLICATIONS theguardian.com, "Google admits collecting Wi-Fi data through Street View cars," May 14, 2010. Retrieved from the Internet on Jul. 25, 2018: https://www.theguardian.com/technology/2010/may/15/google-admits-storing-private-data.

European Patent Application No. 19167175.9, Extended European Search Report, dated Jul. 2, 2019.

\* cited by examiner

TECHNOLOGY FOR MANAGING LOCATION-BASED FUNCTIONALITIES FOR ELECTRONIC DEVICES

FIELD

The present disclosure is directed to managing location-based functionalities associated with electronic devices. More particularly, the present disclosure is directed to technologies for incorporating various location-based data that results in effective operation of location-based services such as geofencing.

BACKGROUND

When shopping in retail stores, individuals typically possess electronic devices such as smartphones. Some retail store chains support applications that are executed by the electronic devices, where the applications have certain modes that offer or enable additional features relevant to the in-store experience. Activation of an "in-store mode" typically relies on geofencing, which uses a device's location to create a virtual geographic boundary that enables an application to trigger a response when the electronic device enters or leaves the boundary. Retail store chains generally set a default geofencing boundary for each retail store (e.g., a radius of fifty (50) meters), such that when it is detected than an electronic device is within the default geofencing boundary for a particular retail store, the in-store mode and its related functionalities are activated.

However, a default geofencing boundary is only consistently accurate when certain location-based and physical characteristics across the retail stores are consistent. In reality, retail stores differ in such characteristics as size and environment (e.g., an urban/rural classification). Additionally, location services that operate on electronic devices differ in accuracy depending on the strength of cellular connections and the density of wireless access points that may be used to pinpoint a device's location, among other factors. This results in instances of false positives, or a scenario in which a device activates the in-store mode when the device is not, in fact, located in the store (e.g., such as if an individual is walking by the store), and false negatives, or a scenario in which the device does not detect when it is actually located within the store. Although the default geofencing boundary may be adjusted, this still does not mitigate accuracy issues resulting from inconsistent store sizes, environmental characteristics, and location services processing.

Accordingly, there is an opportunity for technology to accurately and effectively manage and facilitate geofencing functionalities for electronic devices.

SUMMARY

In an embodiment, a computer-implemented method of managing geofencing features is provided. The method may include: receiving, from an electronic device via a network connection, an estimated location of the electronic device; determining, by a computer processor, that the estimated location of the electronic device is in proximity to a location of a retail store; in response to determining that the estimated location of the electronic device is in proximity to the location of the retail store: accessing population data associated with at least one of the estimated location of the electronic device and the location of the retail store, calculating, by the computer processor based at least in part on the population data, a geofencing boundary for the retail store, and determining that the estimated location of the electronic device is within the geofencing boundary for the retail store; and transmitting, to the electronic device via the network connection, a communication reflecting that the estimated location of the electronic device is within the geofencing boundary for the retail store.

In another embodiment, a system for managing location features is provided. The system may include a transceiver for communicating with an electronic device via a network connection, a memory storing (i) location data associated with a set of retail stores, and (ii) non-transitory computer executable instructions, and a processor interfacing with the transceiver and the memory. The processor may be configured to execute the non-transitory computer executable instructions to cause the processor to: receive, from the electronic device via the transceiver, an estimated location of the electronic device, identify, from the location data stored in the memory, a retail store of the set of retail stores having a location that is in proximity to the estimated location of the electronic device, calculate, based on at least a portion of the location data associated with the retail store, a geofencing boundary for the retail store, determine that the estimated location of the electronic device is within the geofencing boundary for the retail store, generate a command associated with the estimated location of the electronic device being within the geofencing boundary for the retail store, and transmit the command to the electronic device via the transceiver, the command for execution by the electronic device.

In another embodiment, a computer-implemented method of managing retail store modes of an application executable by an electronic device is provided. The method may include: receiving, from the electronic device via a network connection, an estimated location of the electronic device; determining, from a set of location data associated with a retail store, that the estimated location of the electronic device is in proximity to a location of the retail store; calculating, based on at least a portion of the set of location data associated with the retail store, a geofencing boundary for the retail store; determining that the estimated location of the electronic device is within the geofencing boundary for the retail store; and in response to determining that the estimated location of the electronic device is within the geofencing boundary for the retail store: generating a command associated with an in-store mode of the application, and transmitting the command to the electronic device via the network connection, the command, when executed by the electronic device, causing the application to initiate the in-store mode.

DETAILED DESCRIPTION

Figure 1:
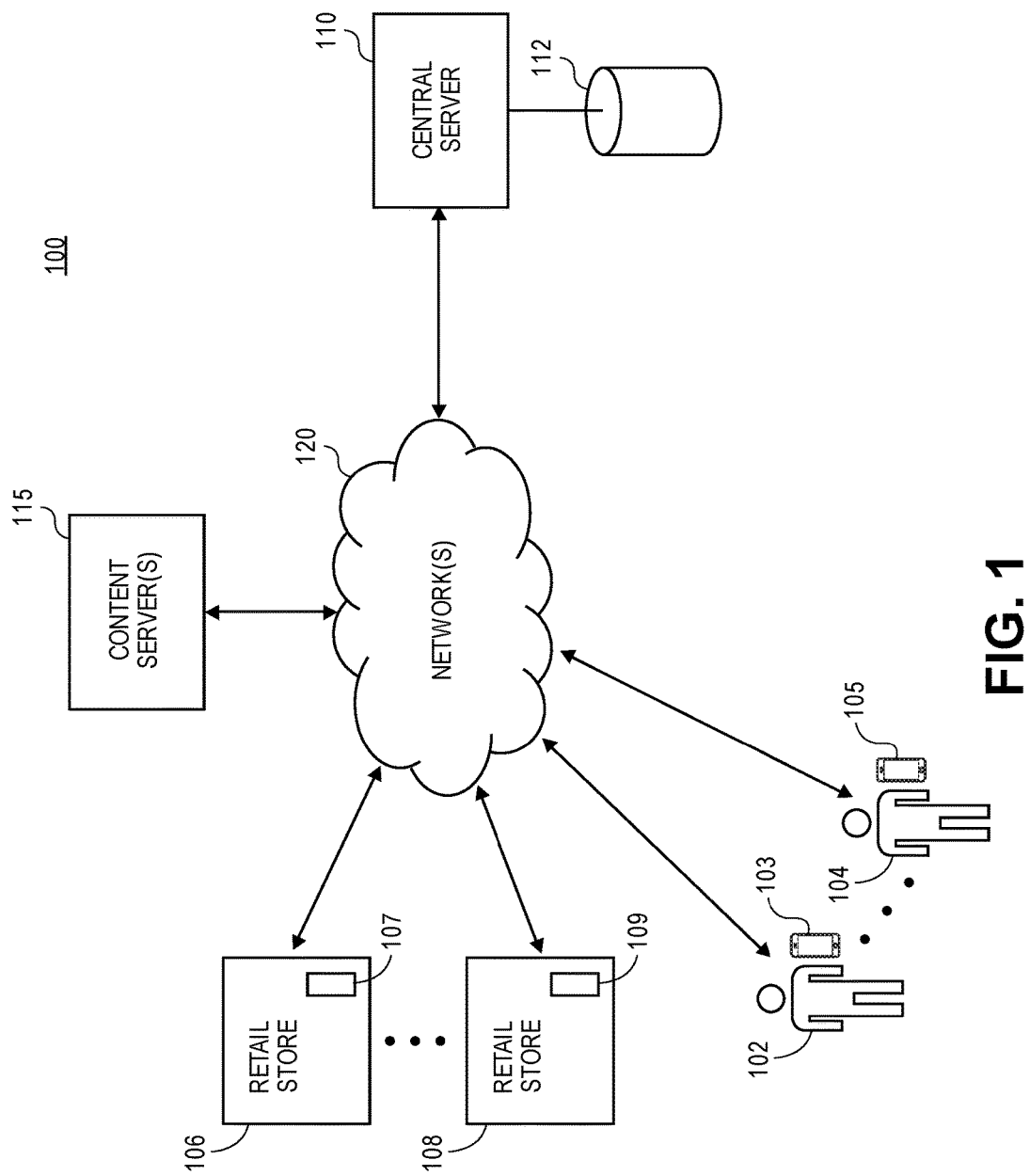
FIG. 1 depicts an overview of components and entities associated with the systems and methods, in accordance with some embodiments.

The present embodiments may relate to, inter alia, technology to accurately and effectively manage and facilitate geofencing functionalities for electronic devices. According to certain aspects, an entity such as a company or corporation may own or manage a plurality of retail stores that sell goods or services for purchase by customers or individuals. The entity may offer or support an application executable by electronic devices of the individuals, where the application may trigger certain functionalities when a respective electronic device enters or leaves a virtual geographic boundary (i.e., a geofencing boundary) associated with a retail store.

According to embodiments, systems and methods may determine a geofencing boundary for a retail store based on data or information associated with a location of the retail store, where the location information may be reflective of an urban-rural classification of the location, among other factors. Generally, the more urban the location, the smaller the geofencing boundary may be to enable more effective and accurate geofencing features; and the more rural the location, the larger the geofencing boundary may be to enable more effective and accurate geofencing features. When the systems and methods determine than an electronic device is within the determined geofencing boundary for a particular retail store, the system and methods may facilitate activation of certain features (e.g., an in-store mode) on the electronic device that may be pertinent to a shopping experience at the retail store.

The systems and methods therefore offer numerous benefits. In particular, the systems and methods determine accurate geofencing boundaries for retail stores, which reduces the occurrence of false positives and false negatives. This, in effect, improves the in-store experience for the customers of the retail stores, as in-store features may be properly activated when the customers enter the retail stores, and deactivated when the customers leave the retail stores. Additionally, the retail store entity may experience an increased amount of customers and/or increased sales revenue. It should be appreciated that additional benefits are envisioned.

The systems and methods discussed herein address a challenge that is particular to geofencing services and functionalities. In particular, the challenge relates to a difficulty in accurately assessing when an electronic device is actually located within a geofencing boundary. Conventionally, a retail store chain specifies a default geofencing boundary for each retail store. However, the locations of retail stores vary with respect to population density and other factors, including the urban-rural classification of the locations. The systems and methods offer improved capabilities to solve these problems by accessing and accounting for certain location-based data to calculate accurate geofencing boundaries specific to each retail store. Further, because the systems and methods employ the collection, analysis, and transmission of data between and among multiple devices, the systems and methods are necessarily rooted in computer technology in order to overcome the noted shortcomings that specifically arise in the realm of geofencing services and functionalities.

According to implementations, the systems and methods may support a dynamic, real-time or near-real-time communication, analysis, and processing of data. In particular, the systems and methods may receive relevant data from electronic devices and components in real-time or near real-time, automatically and dynamically analyze the data, and automatically and dynamically facilitate geofencing features, in real-time or near-real-time.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of users 102, 104 or individuals having or interacting with a respective set of electronic devices 103, 105. Each of the users 102, 104 may be any individual or person who may be interested in purchasing products or services that may be offered for sale by a set of retail stores 106, 108. In an embodiment, each of the set of retail stores 106, 108 may be associated with a retail location of an entity such as a corporation, company, partnership, or the like. For example, the retail store 106 may be associated with example Convenience Store A and the retail store 108 may be associated with example Convenience Store B.

Each of the electronic devices 103, 105 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. The set of retail stores 106, 108 may include a respective set of computers 107, 109 or terminals associated therewith that may support a checkout procedure, a point of sale, and/or other functionalities. In particular, either or both users 102, 104 may purchase products or services from either of the retail stores 106, 108 through the use of the respective computers 107, 109. Although two (2) retail stores 106, 108, two (2) sets of computers 107, 109, two (2) users 103, 105, and two (2) electronic devices 103, 105 are depicted in FIG. 1, it should be appreciated that greater or fewer amounts are envisioned.

The electronic devices 103, 105 and the computers 107, 109 may communicate with a central server 110 via one or more networks 120. The central server 110 may be associated with the entity that owns and/or manages a set of retail locations including the set of retail stores 106, 108. In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The central server 110 may be configured to interface with or support a memory or storage 112 capable of storing various data, such as in one or more databases or other forms of storage.

According to embodiments, the storage 112 may store location-based data or information associated with the set of retail stores 106, 108. Generally, the data or information may be pertinent to the respective locations of the set of retail stores 106, 108, and may be indicative of an urban-rural classification of the respective locations, among other characteristics. For example, the data or information may include addresses, population data, population density data, roadway information, business or retail density information, stoplight information, zoning information, demographic information, and/or other data or information. It should be appreciated that additional or alternative data pertinent to the respective locations of the set of retail stores 106, 108 is envisioned.

The electronic devices 103, 105, the computers 107, 109, and/or the central server 110 may additionally communicate with a content server(s) 115 via the one or more networks 120. According to embodiments, the content server(s) 115 may alternatively or additionally store the location-based data or information associated with the retail stores 106, 108, as described herein. Accordingly, at least the central server 110 may communicate with the content server(s) 115 to retrieve location-based information associated with a particular retail store(s).

Each of the electronic devices 103, 105 may be configured with certain components to facilitate location-detection functionalities, such as a GPS chip and/or one or more transceivers (e.g., WWAN, WLAN, and/or WPAN transceivers), and/or the like. The respective components may receive, access, or generate data that may be indicative of a location of the respective electronic device 103, 105. For example, the GPS chip may be configured to receive GPS coordinates from a GPS satellite(s), a WLAN transceiver may detect wireless access points, as well as the service set identifier (SSID) and media access control (MAC) information for each wireless access point, and cellular connection data from cellular towers.

At least one of the electronic devices 103, 105 may transmit any combination of the location data to the central server 110 via the network(s) 120, where the combination of the location data may be indicative of an estimated location the of at least one of the electronic devices 103, 105. After receiving the location data, the central server 110 may determine, based on the estimated location(s) of the at least one of the electronic device 103, 105 and a location(s) of at least one of the retail stores 106, 108, whether the at least one of the electronic devices 103, 105 is proximate to (e.g., within a certain distance of) the at least one of the retail stores 106, 108.

Additionally, the central server 110 may calculate a geofencing boundary for at least one of the retail stores 106, 108, based on the location-based data or information associated with the retail store(s) 106, 108, and may determine whether the electronic device(s) 103, 105 is located within the geofencing boundary(ies). If the electronic device(s) 103, 105 is located within the geofencing boundary(ies), the central server 110 may facilitate certain location-based services, including initiating or activating certain geofencing functionalities supported by the electronic device(s) 103, 105. Similarly, if the central server 110 determines that the electronic device(s) 103, 105 departs the geofencing boundary(ies), the central server may cease or deactivate the certain functionalities supported by the electronic device(s) 103, 105 These functionalities are further discussed with respect to FIG. 2.

Figure 2:
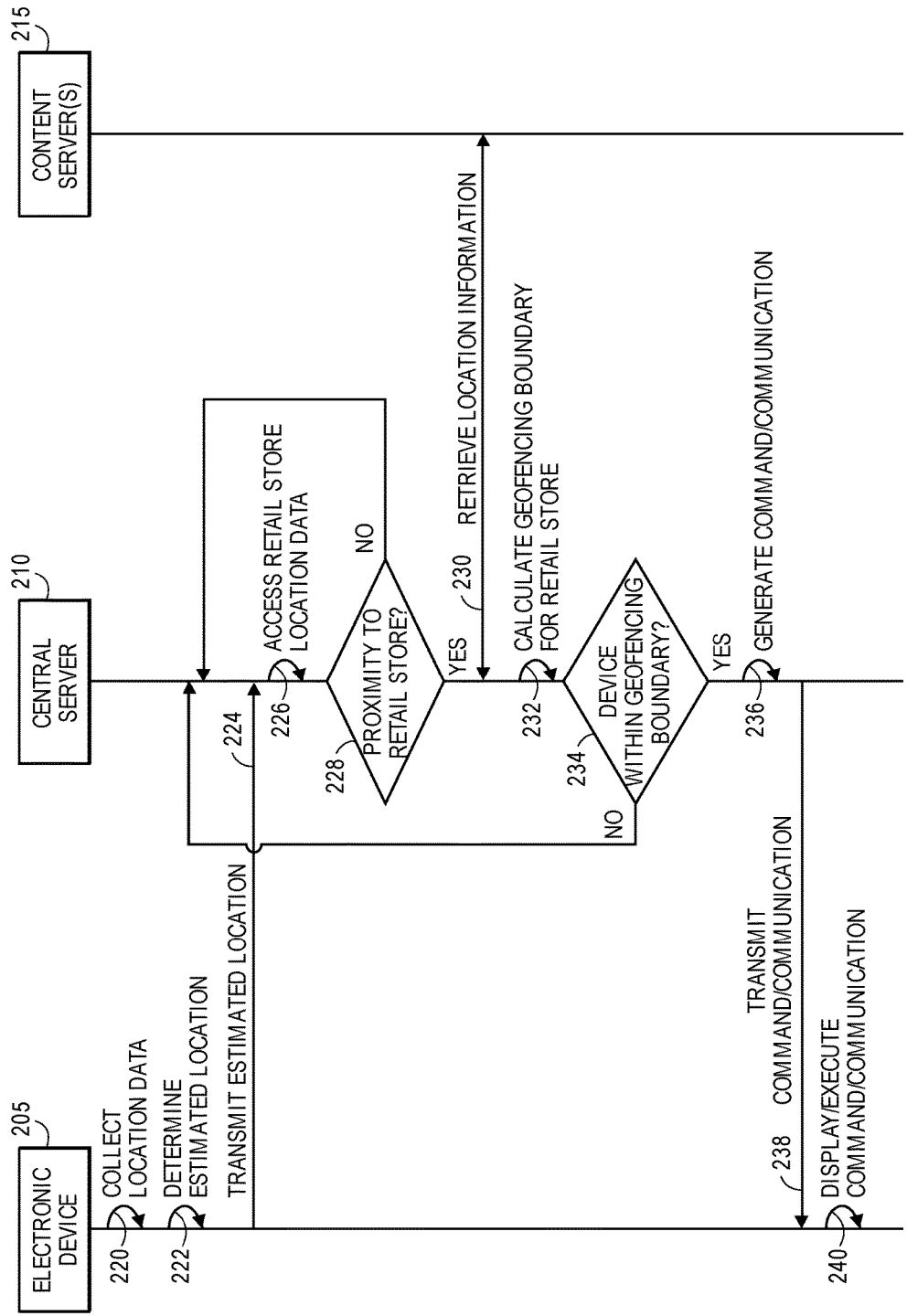
FIG. 2 depicts an example signal diagram associated with managing and facilitating geofencing features, in accordance with some embodiments.

FIG. 2 depicts a signal diagram 200 associated with managing location-based functionalities for implementation on an electronic device, in accordance with some embodiments. The signal diagram includes an electronic device 205 (such as either of the electronic devices 103, 105 as discussed with respect to FIG. 1) that may be operated by an individual, a central server 210 (such as the central server 110 as discussed with respect to FIG. 1), and a content server(s) 215 (such as the content server(s) 115 as discussed with respect to FIG. 1). The central server 210 and the content server(s) 215 may be, in combination, a set of back-end components that are remote from the electronic device 205, where the set of back-end components may be associated with a retail company having an associated set of retail stores or locations. It should be appreciated that additional or alternative components and devices are envisioned.

According to embodiments, the electronic device 205 may support and execute an application associated with the set of retail stores, where the application may be configured for different modes. For example, one of the modes may be "normal operation" (i.e., when the electronic device 205 is deemed to be not located within a retail store), and one of the modes may be "in-store mode" (i.e., when the electronic device 205 is deemed to be located in a retail store). Additionally, the electronic device 205 may support notifications, badges, banners, and/or the like that may be associated with the application.

The signal diagram 200 may begin when the electronic device 205 collects (220) location data. According to embodiments, the electronic device 205 may collect one or more different types of data that may be indicative of the location of the electronic device 205, or from which the location of the electronic device 205 may be estimated, calculated, or determined.

In an embodiment, the location data may consist of GPS coordinates that the electronic device 205 may receive from a GPS satellite(s). In an additional or alternative embodiment, the location data may consist of cellular tower signal data that the electronic device 205 may receive from one or more proximate cellular towers, where the electronic device 205 may triangulate the cellular tower signal data to estimate its location. In an additional or alternative embodiment, the location data may include wireless access point data (i.e., data indicative of detected nearby wireless access points), which may include service set identifier (SSID) data and/or media access control (MAC) address data of the respective access point. The wireless access point data may indicate an amount and density of detected nearby wireless access points. In an implementation, the wireless access point data may be reconciled with a database of known locations of the wireless access points. Accordingly, the wireless access point data may be used to determine or refine the location of the electronic device 205.

The electronic device 205 may determine (222) its estimated location using one or more techniques and using any combination of the location data collected in (220) (i.e., GPS data, cellular tower signal data, and wireless access point data). For example, the electronic device 205 may derive its estimated location from GPS coordinates. For further example, the electronic device 205 may derive its estimated location from a combination of wireless access point data and a triangulation of cellular tower signal data.

The electronic device 205 may transmit (224) the estimated location to the central server 210 via a network connection. In an implementation, the electronic device 205 may additionally or alternatively transmit at least a portion of the wireless access point data, where the portion of the wireless access point data may indicate an amount and/or density of access points detected by the electronic device 205. After receiving the estimated location (and/or optionally the wireless access point data), the central server 210 may access (226) location data associated with a set of retail stores. In embodiments, each retail store may have an associated location which may be represented by a set of latitude/longitude coordinates, which may represent an approximate center of the retail store. The location data may further include data indicative of the size or shape of the retail store, such as a footprint, perimeter, square footage, and/or other data. Additionally or alternatively, the location may include a default geofencing boundary for the retail store. In embodiments, the default geofencing boundary may be represented by different distances, shapes, and parameters. For example, the default geofencing boundary for a given retail store may be a circle with a radius of fifty (50) meters, two hundred (200) meters, or other distances from the designated center of the given retail store.

The central server 210 may determine (228) whether the electronic device 205 is in proximity to a retail store of the set of retail stores. In particular, the central server 210 may identify a retail store having a location that is closest to the estimated location of the electronic device 205, determine a distance between the estimated location of the electronic device 205 and the location of that retail store, and compare the determined distance to a threshold distance. If the determined distance exceeds (or at least meets) the threshold distance, then the central server 210 may deem that the electronic device 205 is not within proximity to a retail store ("NO"), and processing may repeat, end, or proceed to other functionality. If the determined distance does not exceed (or meets) the threshold distance, then the central server 210 may deem that the electronic device 205 is within proximity to a retail store ("YES"), and processing may proceed to (230). It should be appreciated that the central server 210 may employ other techniques to determine whether the electronic device 205 is in proximity to a retail store of the set of retail stores.

At (230), the central server 210 may optionally retrieve location information associated with the proximate retail store (and/or with the estimated location of the electronic device 205) from the content server(s) 215. It should be appreciated that the central server 210 may locally store or access location information associated with the set of retail stores, such as in a database, and/or that the central server 210 may previously interface with the content server(s) to retrieve and store the location information. According to embodiments, the location information may include various data and information pertinent to the location of the proximate retail store, such as data indicative of an urban/rural classification for a specific area (e.g., a ZIP code) associated with a given retail store. In particular, the data and information may indicate addresses, population data, population density data, roadway information, business or retail density information, stoplight information, zoning information, demographic information, and/or other data or information.

The central server 210 may calculate (232) a geofencing boundary for the retail store (i.e., the retail store that is closest to the estimated location of the electronic device 205). According to embodiments, the central server 210 may account for various variables, factors, or parameters, or combinations thereof, when calculating the geofencing boundary. Generally, the central server 210 may calculate the geofencing boundary based at least in part on the location information retrieved or accessed in (230). In an implementation, the central server 210 may calculate the geofencing boundary by modifying, based on the location information, the initial default geofencing boundary associated with the retail store.

Similar to the default geofencing boundary, the calculated geofencing boundary may be represented by different distances, shapes, and parameters. For example, the geofencing boundary for a given retail store may be a circle with a radius of fifty (50) meters, two hundred (200) meters, or other distances from the designated center of the given retail store. As an additional example, the geofencing boundary for a given retail store may encompass all publicly-accessible roadways and walkways within a radius of one hundred (100) meters of the designated center of the given retail store.

Any population data included in the location data may reflect an urban/rural classification associated with the location or area of the retail store. Generally, the more rural the location/area, the larger the geofencing boundary of the retail store may be to efficiently and effectively manage an in-store mode, so as to reduce false negative instances. Similarly, the more urban the location/area, the smaller the geofencing boundary of the retail store may be to efficiently and effectively manage an in-store mode, so as to reduce false positive instances.

For example, assume that the default geofencing boundary is set at a fifty (50) meter radius for each of Retail Store A and Retail Store B. Additionally, Retail Store A is located in Manhattan (population density of 66,940 people/square mile) and Retail Store B is located in Ames, Iowa (population density of 2,435 people/square mile). The central server 210 may determine, based at least in part on the respective population densities, that Retail Store A should have a geofencing boundary having a seventeen (17) meter radius and that Retail Store B should have a geofencing boundary having a two hundred ten (210) meter radius.

Additionally or alternatively, in calculating the geofencing boundary, the central server 210 may account for any or all of the location data accessed in (226) and/or any or all of the data or information transmitted from the electronic device 205 in (224). For example, assume that the electronic device 205 is located in Ames, Iowa, and sends wireless access point data to the central server 210 that indicates a larger amount of wireless networks available to the electronic device 205 (e.g., indicating that the electronic device 205 is located in a town center of Ames). Additionally, the size or footprint of Retail Store B may be larger than average. Accordingly, the central server 210 may account for the population density of Ames, the wireless access point data, and the larger footprint to determine that Retail Store B should have a geofencing boundary having a seventy five (75) meter radius.

It should be appreciated that, in calculating the geofencing boundary for a given retail store, the central server 210 may utilize various formulas, models, calculations, algorithms, analyses, and relationships on various combinations of the available data or information. Additionally or alternatively, the central server 210 may weight certain parameters or factors different from other parameters or factors.

The central server 210 may determine (234) whether the electronic device 205 is located within the geofencing boundary calculated in (232). For example, if the geofencing boundary is a circular area having a specified radius and a center being a designated location of the retail store, the central server 210 may determine whether the estimated location of the electronic device 205 is located in the circular area. If the estimated location of the electronic device 205 is not located within the geofencing boundary ("NO"), processing may repeat, end, or proceed to other functionality. If the estimated location of the electronic device 205 is located within the geofencing boundary ("YES"), processing may proceed to (236).

At 236, the central server 210 may generate (236) a command or communication associated with or reflecting that the electronic device 205 is located within the geofencing boundary of the retail store. According to embodiments, any command may be associated with an in-store mode (or similar mode) that may be triggered within an application that executes on the electronic device 205. Further, any communication may be a notification or indication displayable by the electronic device 205 that may indicate that the electronic device 205 is deemed to be located in the retail store.

The central server 210 may transmit (238) the command or communication to the electronic device 205 via a network connection. After receipt of the command or notification, the electronic device 205 may execute or display (240) the command or communication. In particular, if the central server 210 transmits a command to the electronic device 205, the electronic device 205 may execute the command to cause an application to perform a certain action. For example, if the application is associated with the retail store, the command may cause the application to enter an in-store mode that may enable a user of the electronic device 205 to review certain information or facilitate certain functionalities that are relevant or related to being within the retail store (e.g., viewing where items are located within the store, clipping coupons, facilitating with checkout, accessing account information, etc.). If the central server 210 transmits a communication to the electronic device 205, the electronic device 205 may display, via a user interface, the communication or a portion thereof. For example, the communication may be a push notification that alerts the user of the electronic device 205 that the user is deemed to be within the retail store. It should be appreciated that additional various commands and communications are envisioned.

Figure 3B:
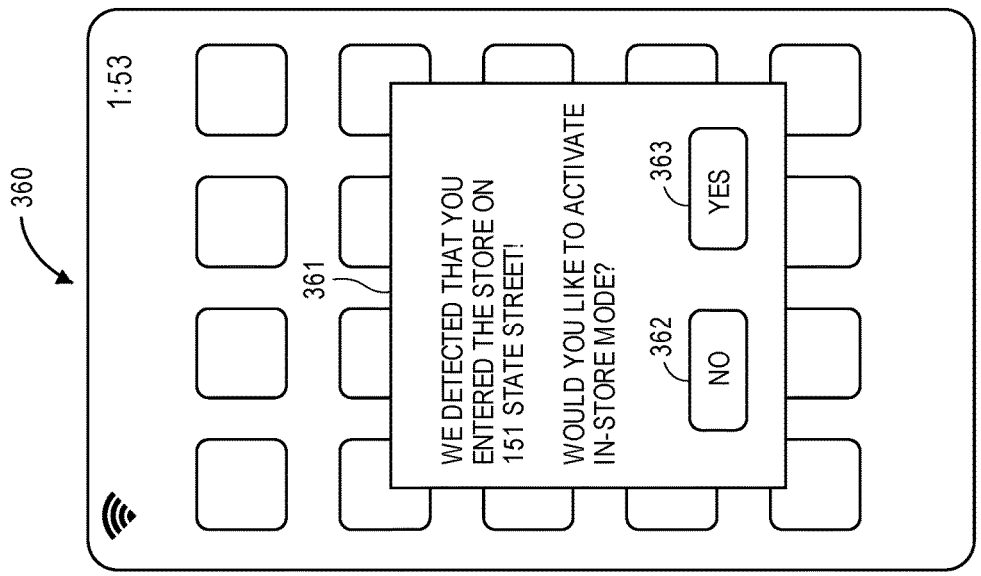
FIGS. 3A and 3B depict example user interfaces associated with geofencing features, in accordance with some embodiments.
Figure 3A:
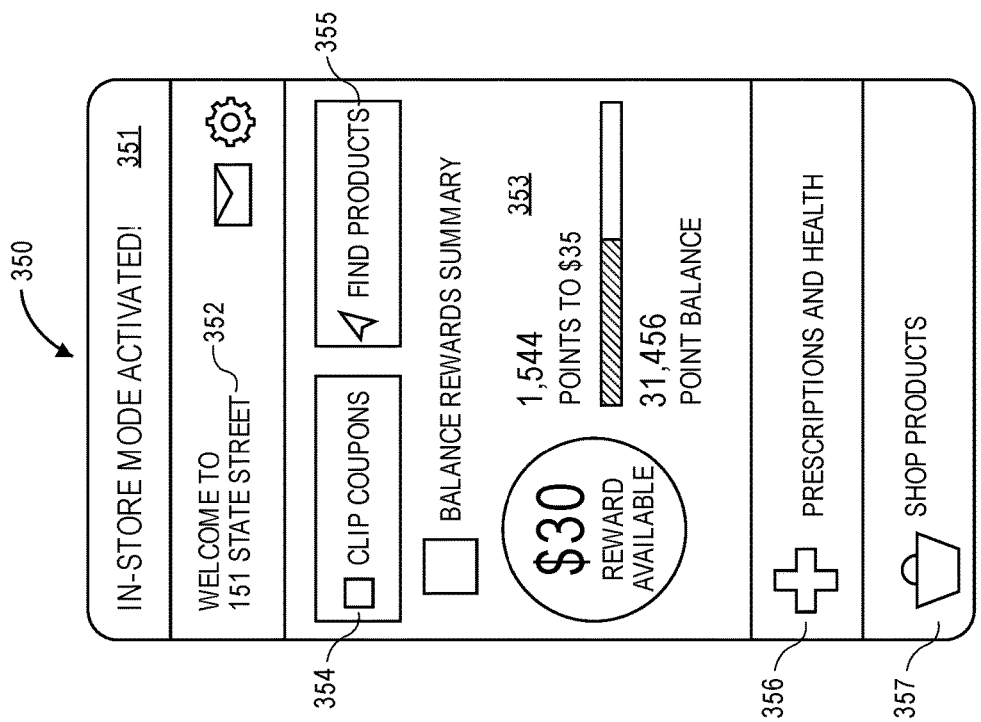

FIGS. 3A and 3B illustrate example interfaces associated with the systems and methods. An electronic device (e.g., a mobile device, such as a smartphone) may be configured to display the interfaces and/or receive selections and inputs via the interfaces, where the electronic device may be associated with a user who may be a customer or potential customer of a retail store. One or more dedicated applications that are configured to operate on the electronic device may display the interfaces. It should be appreciated that the interfaces are merely examples and that alternative or additional content is envisioned.

FIG. 3A illustrates an interface 350 of an application associated with a retail store. In embodiments, the electronic device may receive a command from a central server to initiate an in-store mode of an application (such as if the central server detects that the electronic device is within a geofencing boundary for the retail store), and may accordingly display the interface 350 in response to receiving the command. As illustrated in FIG. 3A, the interface 350 includes an indication 351 that the in-store mode of the application has been activated, and an identification 352 of the retail store in which the electronic device is located.

The interface 350 may further enable the user to make certain selections. In particular, the interface 350 includes a set of selections 354-357 for the following functionalities: clip coupons, find products, prescriptions & health, and shop products. Additionally, the interface 350 includes an information section 353 that details certain information associated with a user account (as shown: available rewards, point balance, and points needed for next reward).

FIG. 3B illustrates an interface 360 that may be displayed by the electronic device. As illustrated in FIG. 3B, the interface 360 may include a home screen of the electronic device with a notification 361 overlaid thereon. The electronic device may display the notification 361 in response to receiving a communication from a central server indicating that the electronic device is located at the retail store (such as if the central server detects that the electronic device is within a geofencing boundary for the retail store).

The notification 361 may indicate that the electronic device was detected to have entered the store on 151 State Street. Further, the notification 361 enables the user to select whether to activate an in-store mode of an application (such as the in-store mode as illustrated in FIG. 3A) via a "NO" selection 362 and a "YES" selection 363. According to embodiments, if the user selects the "NO" selection 362, the electronic device may dismiss the notification 361; and if the user selects the "YES" selection 363, the electronic device may activate the in-store mode.

Figure 4:
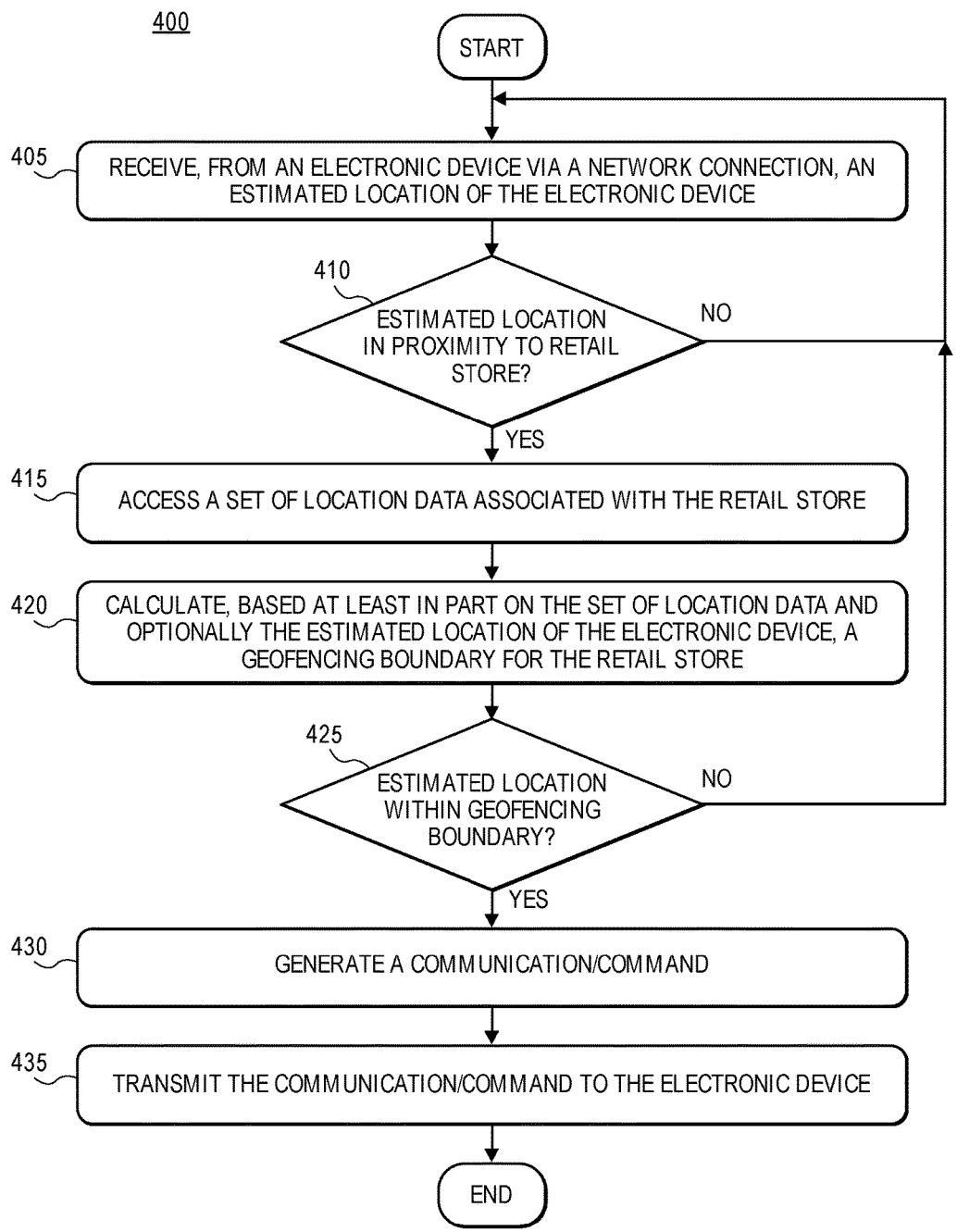
FIG. 4 depicts an example flow diagram associated with managing and facilitating geofencing features, in accordance with some embodiments.

FIG. 4 depicts is a block diagram of an example method 400 of processing geofencing features. The method 400 may be facilitated by a server (such as the central server 210 as discussed with respect to FIG. 2) that may be in communication with an electronic device of a user (such as the electronic device 205 as discussed with respect to FIG. 2).

The method 400 may begin when the server receives (block 405), from the electronic device via a network connection, an estimated location of the electronic device. In embodiments, the estimated location may consist of at least one of: GPS coordinates of the electronic device, wireless access point data, and cellular triangulation data. The server may determine (block 410) whether the estimated location is in proximity to a retail store of a set of retail stores. In embodiments, the server may access a lookup table (or other data structure) that lists the set of retail stores having a respective set of locations, and may determine, from the data of the lookup table, that a distance between the estimated location of the electronic device and a location of the retail store does not exceed a threshold distance. If the server determines that the estimated location is not in proximity to the retail store ("NO"), processing may end, repeat, or proceed to other functionality. If the server determines that the estimated location is in proximity to the retail store ("YES"), processing may proceed to block 415.

At block 415, the server may access a set of location data associated with the retail store. In embodiments, the set of location data may include a combination of information associated with the location of the retail store, including addresses, population data, population density data, roadway information, business or retail density information, stoplight information, zoning information, demographic information, and/or other data or information. The set of location data may further indicate a size or geographic footprint of the retail store.

The server may calculate (block 420), based at least in part on the set of location data and optionally the estimated location of the electronic device, a geofencing boundary for the retail store. In particular, the server may calculate the geofencing boundary based on any combination of the set of location data and/or the estimated location of the electronic device, including population data, wireless access point data, retail store size, and/or other data. In an implementation, the retail store may have a default geofencing boundary, and the server may modify (i.e., increase or decrease) the default geofencing boundary to calculate the geofencing boundary.

The server may determine (block 425) whether the estimated location is within the geofencing boundary of the retail store. If the server determines that the estimated location is not within the geofencing boundary ("NO"), processing may end, repeat, or proceed to other functionality. If the server determines that the estimated location is within the geofencing boundary ("YES"), processing may proceed to block 430.

At block 430, the server may generate a communication or command. In embodiments, the communication or command may reflect that the electronic device is within the geofencing boundary (i.e., is deemed to be within the retail store). The server may transmit (block 435) the communication or command to the electronic device, which may display or activate the communication or command as appropriate. In an embodiment, the electronic device may cause an application to activate an in-store mode associated with the retail store.

Figure 5:
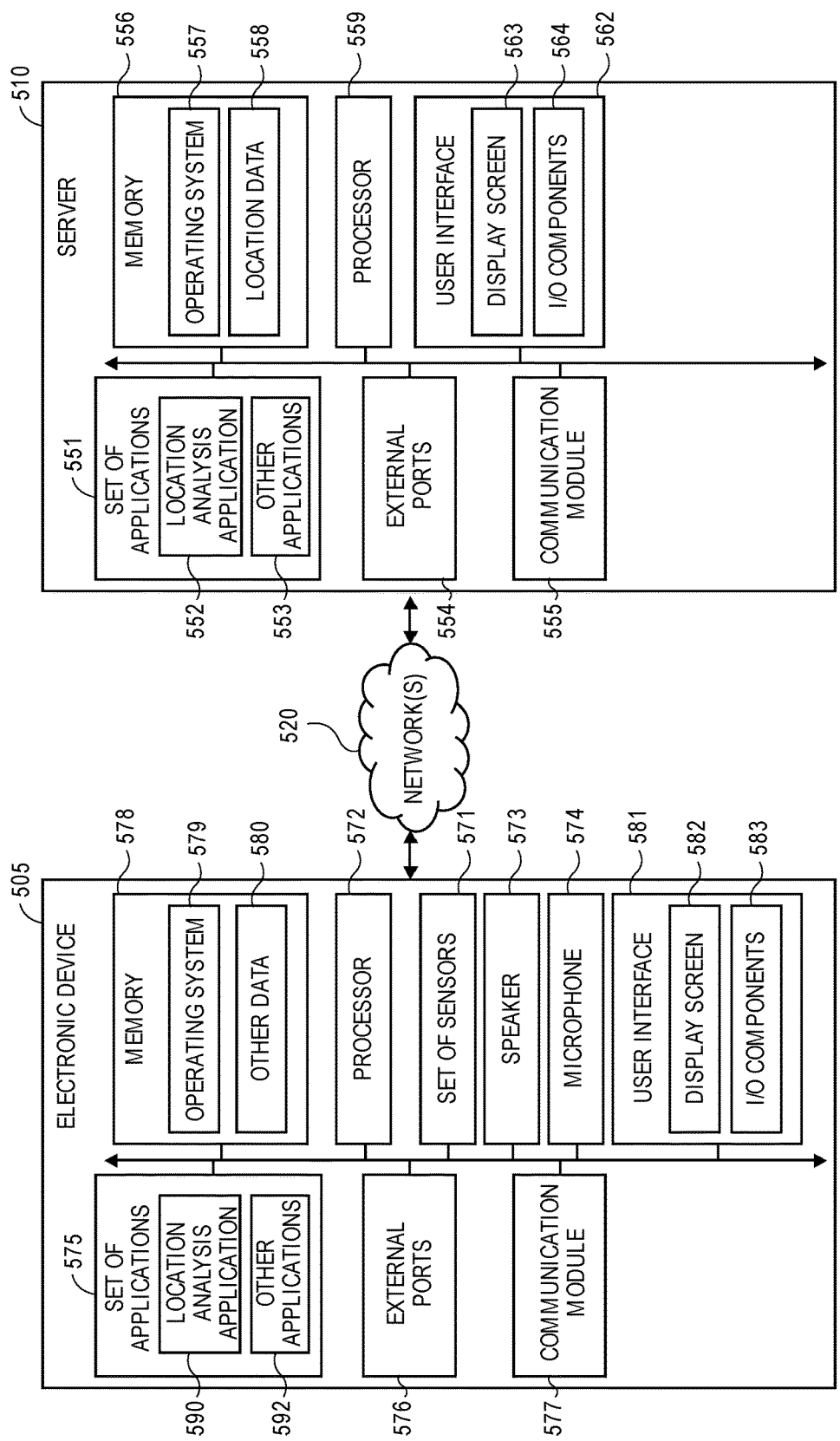
FIG. 5 is a block diagram of an example electronic device and an example server, in accordance with some embodiments.

FIG. 5 illustrates a hardware diagram of an example electronic device 505 (such as the electronic device 205 as discussed with respect to FIG. 2) and an example server 510 (such as the central server 210 as discussed with respect to FIG. 2), in which the functionalities as discussed herein may be implemented.

The electronic device 505 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be a location analysis application 590 configured to facilitate various of the functionalities as discussed herein. It should be appreciated that one or more other applications 592 are envisioned.

The processor 572 may interface with the memory 578 to execute the operating system 579 and the set of applications 575. According to some embodiments, the memory 578 may also store other data 580 that may include data accessed or collected by various sensors. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 505 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576.

The electronic device 505 may include a set of sensors 571 such as, for example, a location module (e.g., a GPS chip), an image sensor, an accelerometer, a clock, a gyroscope, a compass, a yaw rate sensor, a tilt sensor, telematics sensors, and/or other sensors. The electronic device 505 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs). According to some embodiments, the user may access the electronic device 505 via the user interface 581 to review information such as alerts or notifications, make selections, and/or perform other functions. Additionally, the electronic device 505 may include a speaker 573 configured to output audio data and a microphone 574 configured to detect audio.

In some embodiments, the electronic device 505 may perform the functionalities as discussed herein as part of a "cloud" network or may otherwise communicate with other hardware or software components within the cloud to send, retrieve, or otherwise analyze data.

As illustrated in FIG. 5, the electronic device 505 may communicate and interface with the server 510 via the network(s) 520. The server 510 may include a processor 559 as well as a memory 556. The memory 556 may store an operating system 557 capable of facilitating the functionalities as discussed herein as well as a set of applications 551 (i.e., machine readable instructions). For example, one of the set of applications 551 may be a location analysis application 552 configured to facilitate various of the functionalities discussed herein. It should be appreciated that one or more other applications 553 are envisioned.

The processor 559 may interface with the memory 556 to execute the operating system 557 and the set of applications 551. According to some embodiments, the memory 556 may also store location data 558, such as location data associated with a set of retail stores. The memory 556 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 510 may further include a communication module 555 configured to communicate data via the one or more networks 520. According to some embodiments, the communication module 555 may include one or more transceivers (e.g., WWAN, WLAN, and/or WPAN transceivers) functioning in accordance with IEEE standards, 3GPP standards, or other standards, and configured to receive and transmit data via one or more external ports 554. For example, the communication module 555 may receive, from the electronic device 505, location-based data.

The server 510 may further include a user interface 562 configured to present information to a user and/or receive inputs from the user. As shown in FIG. 5, the user interface 562 may include a display screen 563 and I/O components 564 (e.g., ports, capacitive or resistive touch sensitive input panels, keys, buttons, lights, LEDs). According to some embodiments, the user may access the server 510 via the user interface 562 to review information, make changes, input training data, and/or perform other functions.

In some embodiments, the server 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 572, 559 (e.g., working in connection with the respective operating systems 579, 557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of managing geofencing features, comprising:
    receiving, from an electronic device via a network connection, an estimated location of the electronic device;
    determining, by a computer processor, that the estimated location of the electronic device is in proximity to a location of a store, wherein the store (i) is located within a specific area, and (ii) has a default geofencing boundary associated therewith;
    in response to determining that the estimated location of the electronic device is in proximity to the location of the store:
        accessing a population density associated with the specific area in which the store is located,
        calculating, by the computer processor, a geofencing boundary for the store by modifying the default geofencing boundary associated with the store based at least in part on the population density, and
        determining that the estimated location of the electronic device is within the geofencing boundary for the store; and
    transmitting, to the electronic device via the network connection, a communication reflecting that the estimated location of the electronic device is within the geofencing boundary for the store.

2. The computer-implemented method of claim 1, wherein receiving the estimated location of the electronic device comprises:
    receiving at least one of: GPS coordinates of the electronic device, wireless access point data, and cellular triangulation data.

3. The computer-implemented method of claim 2, wherein calculating the geofencing boundary for the store by modifying the default geofencing boundary is further based on the wireless access point data.

4. The computer-implemented method of claim 1, wherein determining that the estimated location of the electronic device is in proximity to the location of the store comprises:
    accessing a lookup table listing a plurality of stores having a respective plurality of locations; and
    determining, from the lookup table, that a distance between the estimated location of the electronic device and the location of the store does not exceed a threshold distance.

5. The computer-implemented method of claim 1, wherein calculating the geofencing boundary for the store by modifying the default geofencing boundary is further based on a size of the store.

6. The computer-implemented method of claim 1, wherein transmitting, to the electronic device via the network connection, the communication reflecting that the estimated location of the electronic device is within the geofencing boundary for the store comprises:
    transmitting the communication to the electronic device via the network connection, wherein the communication causes an application executing on the electronic device to activate an in-store mode associated with the store.

7. A system for managing location features, the system comprising:
    a transceiver for communicating with an electronic device via a network connection;
    a memory storing (i) location data associated with a set of stores, and (ii) non-transitory computer executable instructions; and
    a processor interfacing with the transceiver and the memory, wherein the processor is configured to execute the non-transitory computer executable instructions to cause the processor to:
        receive, from the electronic device via the transceiver, an estimated location of the electronic device,
        identify, from the location data stored in the memory, a store of the set of stores having a location that is in proximity to the estimated location of the electronic device, wherein the store (i) is located within a specific area, and (ii) has a default geofencing boundary associated therewith,
        identifying, from the location data stored in the memory, a population density associated with the specific area in which the store is located,
        calculate a geofencing boundary for the store by modifying the default geofencing boundary associated with the store based on at least the population density,
        determine that the estimated location of the electronic device is within the geofencing boundary for the store,
        generate a command associated with the estimated location of the electronic device being within the geofencing boundary for the store, and
        transmit the command to the electronic device via the transceiver, the command for execution by the electronic device.

8. The system of claim 7, wherein the estimated location comprises at least one of: GPS coordinates of the electronic device, wireless access point data, and cellular triangulation data.

9. The system of claim 8, wherein the geofencing boundary for the store is calculated by modifying the default geofencing boundary further based on the wireless access point data.

10. The system of claim 7, wherein to identify the store of the set of stores having the location that is in proximity to the estimated location of the electronic device, the processor is configured to:
    determine that a distance between the estimated location of the electronic device and the location of the store does not exceed a threshold distance.

11. The system of claim 7, wherein the command, when executed by the electronic device, causes an application of the electronic device to initiate an in-store mode.

12. The system of claim 7, wherein the command, when executed by the electronic device, causes the electronic device to display a notification indicating that the electronic device is located within the store.

13. A computer-implemented method of managing store modes of an application executable by an electronic device, comprising:
- receiving, from the electronic device via a network connection, an estimated location of the electronic device;
- determining, from a set of location data associated with a store, that the estimated location of the electronic device is in proximity to a location of the store, wherein the store (i) is located within a specific area, and (ii) has a default geofencing boundary associated therewith, wherein the set of location data indicates a population density associated with the specific area in which the store is located;
- calculating a geofencing boundary for the store by modifying the default geofencing boundary associated with the store based on at least the population density;
- determining that the estimated location of the electronic device is within the geofencing boundary for the store; and
- in response to determining that the estimated location of the electronic device is within the geofencing boundary for the store:
  - generating a command associated with an in-store mode of the application, and
  - transmitting the command to the electronic device via the network connection, the command, when executed by the electronic device, causing the application to initiate the in-store mode.

14. The computer-implemented method of claim 13, wherein receiving the estimated location of the electronic device comprises:
- receiving at least one of: GPS coordinates of the electronic device, wireless access point data, and cellular triangulation data.

15. The computer-implemented method of claim 14, wherein calculating the geofencing boundary for the store by modifying the default geofencing boundary is further based on the wireless access point data.

16. The computer-implemented method of claim 13, wherein determining that the estimated location of the electronic device is in proximity to the location of the store comprises:
- accessing a lookup table listing a plurality of stores having a respective plurality of locations; and
- determining, from the lookup table, that a distance between the estimated location of the electronic device and the location of the store does not exceed a threshold distance.

17. The computer-implemented method of claim 13, wherein calculating the geofencing boundary for the store by modifying the default geofencing boundary is further based on a size of the store.

* * * * *